United States Patent [19]

Vali

[11] Patent Number: 4,888,478
[45] Date of Patent: Dec. 19, 1989

[54] LINE TRACER IMPROVED CORNER CIRCUIT WITH SPEED VARYING SAMPLING

[75] Inventor: Enn Vali, Burlington, Canada

[73] Assignee: Westinghouse Canada Inc., Hamilton, Canada

[21] Appl. No.: 90,901

[22] Filed: Aug. 31, 1987

[30] Foreign Application Priority Data

Apr. 1, 1987 [CA] Canada ................................... 533622

[51] Int. Cl.$^4$ .......................... G05B 1/00; G05B 21/02
[52] U.S. Cl. ..................................... 250/202; 318/577
[58] Field of Search .......................... 250/202; 318/577

[56] References Cited

U.S. PATENT DOCUMENTS

| 3,727,120 | 4/1973 | Jewell et al. ............... 318/577 X |
| 4,641,021 | 2/1987 | Vali ............................. 250/202 |
| 4,658,127 | 4/1987 | Ferrari ..................... 318/577 X |

FOREIGN PATENT DOCUMENTS

| 0790255 | 12/1980 | U.S.S.R. ......................... 250/202 |
| 81/01889 | 7/1981 | World Int. Prop. O. ......... 250/202 |

Primary Examiner—David C. Nelms
Assistant Examiner—Steven J. McGowan
Attorney, Agent, or Firm—Edward H. Oldham

[57] ABSTRACT

In an optical pattern tracer which uses sample and hold circuits for signal processing filtering of the signal to reduce undershoot can be attained by manipulation of the sample and hold processing circuits. The present application varies the holding capacitor to produce a varied low pass filter effect.

5 Claims, 2 Drawing Sheets

LINE TRACER IMPROVED CORNER CIRCUIT WITH SPEED VARYING SAMPLING

FIELD OF THE INVENTION

This invention relates to optical pattern tracing controls and in particular, to controls of the type which repetitively scan the pattern to be followed in a circular manner, derive a signal from such scanning operation and utilize the signal to control coordinate drive motors.

Typical of such control systems are those disclosed in U.S. Pat. Nos. 3,883,735, issued May 13, 1975 and 3,395,282, issued July 30, 1968. These patents disclose pattern tracers of the circular scanning type for operation with coordinate drive systems.

By a circular scanning tracer is meant a tracer which views the pattern in such a manner that the point observed by the tracing head is caused to rotate repetitively so as to describe a circular path on the surface bearing the pattern when the head is stationary. Naturally, when the head is in translational motion, the point scanned by the tracing head will more closely approach an epicycle.

The pattern detector in the tracing head is arranged to produce a signal indicative of a change of illumination of the detector. The signal representing this transition is then processed and used to control a pair of motors which, when associated with suitable machinery will cause the tracing head and related machine tool to move in a plane in accordance with a pattern as controlled by the motors.

The convolutions performed by the tracing head are similarly performed by the machine tool which may, for example, be a cutting torch and in this way the material to be cut will be shaped in the same form as the pattern being traced by the tracing head.

In tracers of this type it is necessary to correlate the signal produced by the scanning head with information indicating the instantaneous direction of the scanning point.

In the prior art this reference information has been generated as sinusoidal information as for example, in U.S. Pat. No. 3,395,282. The signal indicating change of illumination of the detector in the tracing head is combined with the sinusoidal information to provide the necessary X and Y drive signals. All such optical following devices tend to have errors as they pass around corners caused by the difference between the point of rotation of the scan and the point of actual scan of the pattern. This difference, referred to as lead, is essential to the operation of the system. The amount of lead required depends upon the speed of tracing. On the other hand, the greater the amount of lead provided, the greater tendency of the machine to undershoot at corners.

In the preceding U.S. Patents, it has been proposed to combine the signal from the detector with the sine waves in a pair of sample and hold circuits which sample the sine waves at a time determined by the signal from the detector. It has also been proposed in application, now U.S. Pat. No. 4,641,021, to vary the width of the sampling pulse, thus effectively introducing a variable low pass filter into the system. The low pass filter produces a delay which compensates for the effective lead and thus reduces the undershoot at the corners.

SUMMARY OF THE INVENTION

In accordance with the present invention, an effective low pass filter is introduced in a simpler manner by increasing the capacity in the sample and hold circuits, so that as speed is decreased, the low pass filter effect is increased. In this way the desired result of reducing the undershoot is produced in a simpler and more economic fashion than that disclosed in the preceding application, now U.S. Pat. No. 4,641,021, issued 2-3-87.

A clearer understanding of our invention may be had from a consideration of the following description and drawings.

DESCRIPTION OF THE PREFERRED EMBODIMENT

Figure 1:
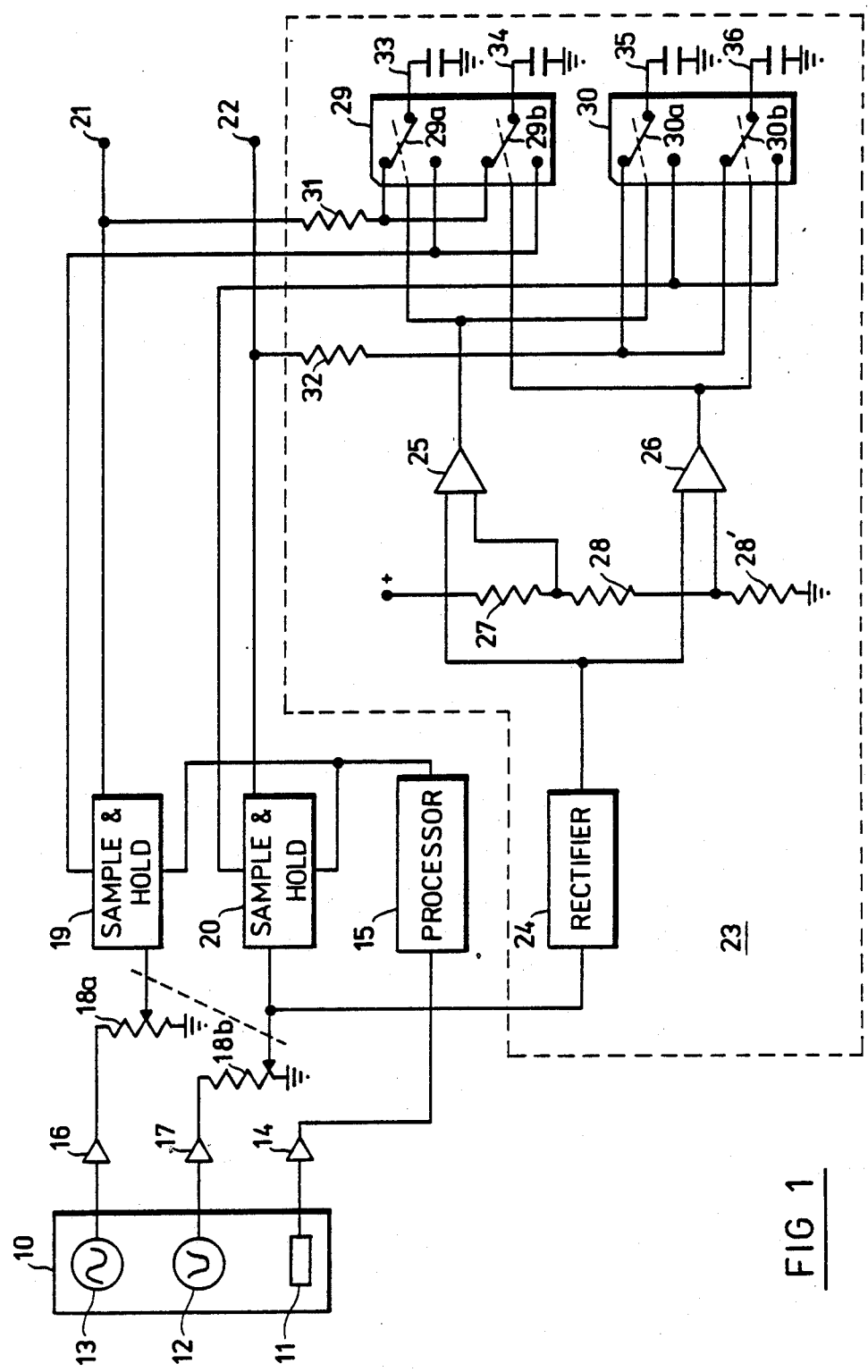
FIG. 1 is a block circuit diagram of a line tracer incorporating this invention.

Considering first FIG. 1, there is shown a scanner 10 which includes a detector 11 and a pair of sinusoid generators 12 and 13. The detector 11 and the generators 12 and 13 are all driven by a common rotating means. The output from the detector 11 is amplified in amplifier 14 and applied to electronic processing means 15, which generates from the output of the detector a suitably shaped sampling pulse. The outputs from the sinusoids generators 12 and 13 are applied to amplifiers 16 and 17 and the outputs from the amplifiers applied to a two section speed controlling potentiometer consisting of two parts, 18A and 18B. The outputs from the speed controlling potentiometer 18A and 18B are applied to a pair of sample and hold circuits 19 and 20. Also applied to the sample and hold circuits 19 and 20 is the output of processor 15, that is a sampling pulse.

The combination of these signals in the sample and hold circuits produces a pair of outputs at terminals 21 and 22, which represent the desired X and Y coordinate drive information respectively.

It will be understood that each sample and hold circuit 19 and 20 normally includes a capacitor on which the signal is held. The value of these capacitors determines the frequency response of the sample and hold circuit. Increasing the capacity of these capacitors in the sample and hold circuits, is equivalent to introducing a low pass filter and the greater the capacity introduced the lower the cut-off frequency.

In order to best reproduce the pattern with minimal undershoot, the circuit should be arranged to produce a lower cut-off frequency at lower tracing speeds. Thus there has been introduced into the system that portion at the lower part of FIG. 1, enclosed within dotted lines and designated 23, which senses the value of the speed signal and adjusts the low pass filter effect in accordance with the speed.

A signal from the potentiometer 18B is applied to rectifier 24, which provides a DC output proportional to the amplitude of the speed signal. This DC value is applied to a pair of comparators 25 and 26 which compare the DC output to a pair of reference potentials derived from potentiometer consisting of resistors 27, 28 and 28'. The output from the comparators control a pair of switches each of which includes a double-pole double-throw switch, the upper switch means is designated 29 and the lower switch means is designated 30.

The switch means 29 is associated with the X coordinate sample and hold circuit 19 and the switch means 30 is associated with the Y coordinate sample and hold circuit 20. Within each switch means are two single-pole double-throw switches, the upper or A switch, 29A and 30A respectively, being controlled by comparator 25 and the lower of B switch, 29B and 30B being controlled by comparator 26. The upper contact of switches 29A and 29B is connected through resistor 31 to the output of sample and hold circuit 19. The upper contact of switches 30A and 30B is connected through resistor 32 to the output of sample and hold circuit 20. The lower contacts of switches 29A and 29B are connected to sample and hold circuit 19 and the lower contacts of switches 30A and 30B are connected to the sample and hold circuit 20.

OPERATION

The operation of the system as a whole, has been previously described in the U.S. patents referred to above. It will be understood that by sampling the sinusoids produced by generators 12 and 13, suitable coordinate outputs signals can be produced at terminals 21 and 22. The relative proportion of the signals is determined by the time of occurrence of the detector pulse with respect to the sinusoid. The absolute value of these signals is determined by the setting of the speed of potentiometer consisting of elements 18A and 18B, which select from their respective amplifiers a certain proportion of the signal, which is a sinusoid of a fixed amplitude, which represents the desired tangential velocity of the tracer.

The signal from potentiometer 18B is applied to rectifier 24 which produces an output proportional to the amplitude of the sinusoid. This DC output is applied to comparators 25 and 26, which compare the DC level with set levels produced from the potentiometer 27, 28 and 28'. Comparator 25 produces an output logic "1" when the output from rectifier 24 drops below the potential between resistors 27 and 28. Similarly the output from comparator 26 is a logic level "1" when the output from rectifier 24 drops below the potential at the junction of resistors 28 and 28'.

At low speed the output from rectifier 24 is less than the potential at the junction of resistors 28 and 28' and obviously less than the potential at the junction between resistors 27 and 28. The output from both comparators therefore is a logic 1, causing 29A, 29B, 30A and 30B all to close on their lower contact, thus connecting capacitor 33 and 34 to sample and hold circuit 19 and capacitor 35 and 36 to sample and hold circuit 20, providing an extra capacity in parallel with the sample and hold capacitor in each sample and hold circuit so that the low pass filter effect is increased.

As the speed control setting is increased, the output from rectifier 24 is increased until such time as the output from rectifier 24 exceeds the potential at the junction of resistors 28 and 28'. At this time the output from comparator 26 becomes a logic 0 permitting switches 29B and 30B to contact their upper contacts and removing capacitors 34 and 36 from across their related sample and hold capacitors. As the speed is further increased, the output from rectifier 24 exceeds the potential at the junction of resistors 27 and 28 and the output from comparator 25 becomes a logic 0 permitting switches 29A and 30A to engage their upper contact and disconnect from their lower contact, thus removing capacitors 33 and 35 from their parallel connection with their related capacitors and their related sample and hold circuits 19 and 20 respectively.

To avoid transients when connecting the capacitors across the sample and hold capacitors, capacitors 33, 34, 35 and 36 are normally connected to the related outputs of their sample and hold circuits through resistors 31 and 32 respectively, until such time as they are connected to the capacitor in the sample and hold circuit. In this way the potential on the capacitors is substantially the same as that of the capacitor in the sample and hold circuit. To avoid disturbing the output from the sample and hold circuits, these capacitors are connected to the sample and hold outputs through resistors 31 and 32.

Figure 2:
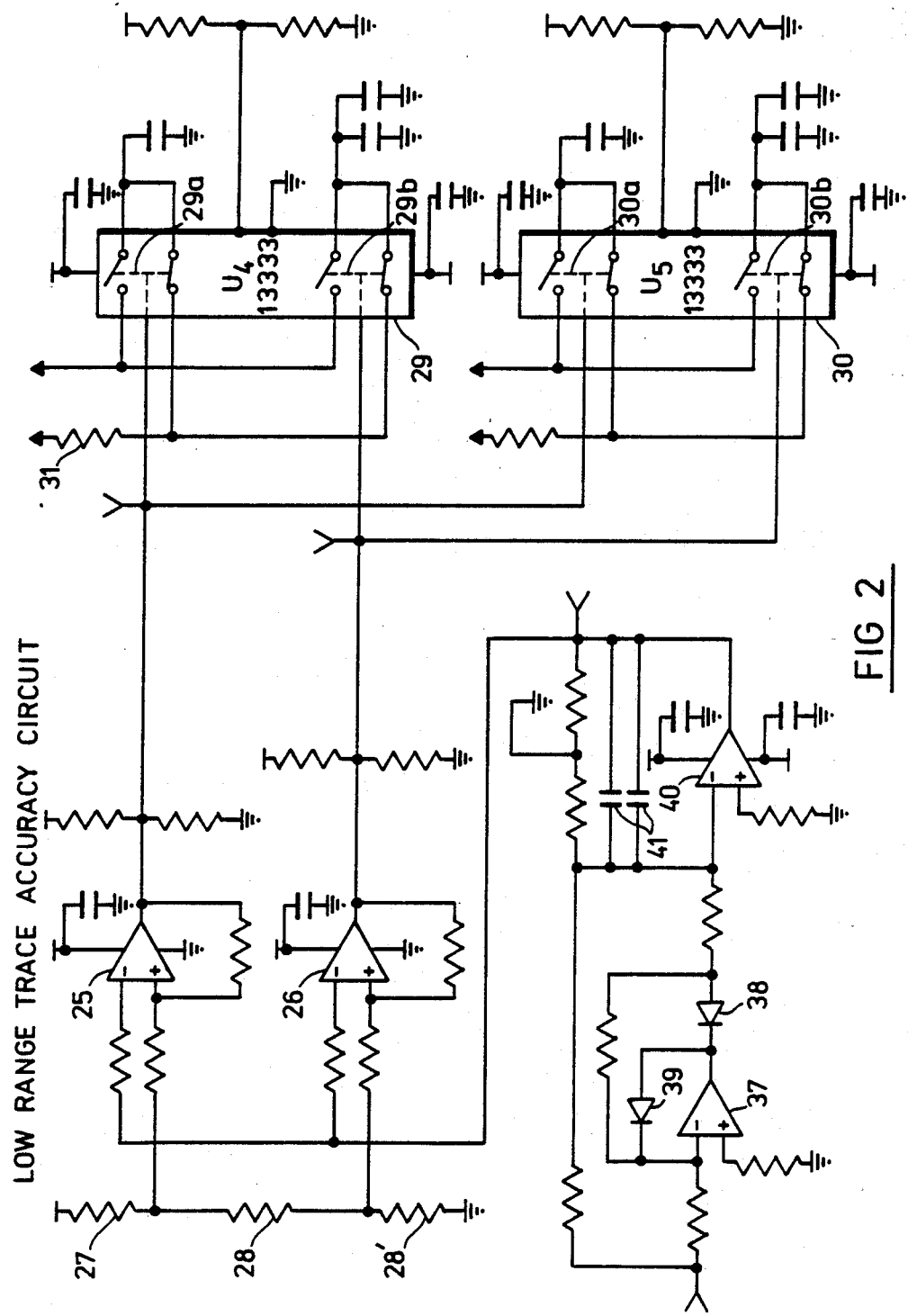
FIG. 2 is a schematic diagram of a portion of the system illustrated in FIG. 1.

The elements of the portion of the system shown in block 23, of FIG. 1 are shown in greater detail in FIG. 2, where the rectifier is shown to include an amplifier 37 and a pair of diodes 38 and 39. The output from the rectifier is applied through a filter including amplifier 40 and capacitor 41 to the input of comparators 25 and 26. The other input to the comparators 25 and 26 is derived from the potentiometer consisting of resistors 27, 28 and 28'. The output from the comparator 25 is connected to the upper portion of switch device 29 and switch device 30. The output from comparator 26 is applied to the lower portion of switch device 29 and switch device 30. Suitable potentials are supplied to the various devices through suitable resistors. The various values of resistors and potentials are not shown since they will vary depending upon the components used and will be properly selected by those skilled in the art.

Switches 29 and 30 may comprise analog switches sold under the trade designation LF 13333 or the equivalent, in which case they will require the various potential supplies and other components shown and not otherwise referred to. On the other hand, they could be replaced by mechanical relays.

It will be seen that in effect three values of low pass filtering are provided: (1) when all capacitors are in place; (2) when only the capacitors 34 and 36 are eliminated; and (3) when capacitors 33, 34, 35 and 36 are all disconnected and the only capacitors present are those incorporated within the sample and hold circuits 19 and 20.

While the invention has been described with only two comparators 25 and 26 and two levels of capacitor switching, it will be evident that more capacitor stages could be introduced to further refine the operation. However, it has been found that the system described is adequate for the purpose in most cases.

While the arrangement has been described in association with a particular line tracing system, it will be evident that the capacitors can be introduced into any low pass filtering arrangement of a coordinate drive line tracer in a similar manner, to increase the low pass filtering affect as the speed is decreased as long as a signal is available, representing speed, which may be compared to reference signals in order to produce the desired switching signals and thus introduce more or less the capacity into the low pass filter.

Various other modifications may be made to the system depending upon the specific components used to attain the desired system operation.

I claim:

1. An optical pattern tracer of the circular scanning type including a photosensitive sampling signal generator and a pair of sample and hold circuits for sampling and holding signals representing the instantaneous value of a pair of coordinate sinusoids at the time of occurrence of said sampling signal each sample and hold circuit including a capacitor for integrating and storing said sample means to selectably vary the value of said capacitors in accordance with the operating speed of said pattern tracer.

2. An optical pattern tracer of the circular scanning type including means to generate a pair of coordinate sinusoids, means to generate a sampling pulse indicative of the relative relationship between the tracer and the pattern, means to use said sampling pulse to sample said coordinate sinusoids and produce coordinate signals indicative of the coordinate velocities required to drive said tracer around said pattern at a selected tangential velocity means to store said coordinate signals comprising a pair of capacitors and means to vary the capacitance of said capacitors in accordance with said selected tangential velocity.

3. An optical pattern tracer including a circular scanning photosensor, means to generate a pair of sinusoids at ninety electrical degrees to each other, means to generate from said photosensor a sampling signal indicative of the relative rotational position of said pattern being traced and said photosensor, means to sample and store on capacitors, the value of each of said pair of sinusoids at the time of occurrence of said sampling signal said stored value representing the coordinate velocity required to move said tracer around said pattern at a selected velocity and means to adjust the capacitance of said capacitors in accordance with said selected velocity.

4. An optical tracer as claimed in claim 3, wherein the selected velocity is determined by the amplitude of said sinusoids.

5. An optical tracer as claimed in claim 4, wherein the amplitude of said sinusoids is compared to a reference and the value of said capacitors is reduced when the amplitude of said sinusoids exceeds said reference.

* * * * *